Dec. 8, 1953 W. B. HEATH 2,661,645
DEVICE FOR HEATING AND SHAPING OR ALTERING
THE PARTS OF AN OPHTHALMIC MOUNTING
Filed July 6, 1949 3 Sheets-Sheet 1

INVENTOR.
WILLIAM B. HEATH
BY
Louis L. Gagnon
ATTORNEY

Dec. 8, 1953 W. B. HEATH 2,661,645
DEVICE FOR HEATING AND SHAPING OR ALTERING
THE PARTS OF AN OPHTHALMIC MOUNTING
Filed July 6, 1949 3 Sheets-Sheet 2

INVENTOR.
WILLIAM B. HEATH
BY
Louis K. Gagnon
ATTORNEY

*INVENTOR.*
WILLIAM B. HEATH
BY
ATTORNEY

Patented Dec. 8, 1953

2,661,645

UNITED STATES PATENT OFFICE 2,661,645

DEVICE FOR HEATING AND SHAPING OR ALTERING THE PARTS OF AN OPHTHALMIC MOUNTING

William B. Heath, New Bedford, Mass., assignor to American Optical Company, Southbridge, Mass., a voluntary association of Massachusetts Application July 6, 1949, Serial No. 103,288

2 Claims. (Cl. 81—3.5)

This invention relates to shape altering devices and has particular reference to a device for use in altering the shapes and sizes of articles formed of heat softenable material such as non-metallic ophthalmic frames or the like.

A principal object of this invention is to provide a device for use in altering the shapes and sizes of articles made of heat softenable material such as ophthalmic frames or the like, and embodying a heating unit having means for directing controlled amounts of heat to selected areas of the parts to be altered and further having means formed with portions shaped to afford maximum ease, efficiency and accuracy in altering said parts.

Another important object is to provide a device of the above character embodying a heating unit comprising a hollow housing having a heating element therein, a cap on said housing and a support on said cap, each of which is individually movable to permit a controlled amount of heat to be directed therethrough onto a frame part positioned adjacent thereto and adjustable means on said support for directing a controlled amount of heat to a confined area of a frame part held adjacent thereto, and a separate anvil having various portions thereof shaped for engagement by the various parts of the frame to be shaped in performing the shaping operations.

Still another object is to provide a device of the above character embodying a base having separate heating and anvil means mounted thereon, the heating means comprising a heating element housed in an upright having an opening in the top thereof for permitting heat to be directed to a frame part held thereover, a cap removably covering said opening and having a second opening therein of smaller dimension than said first opening, a support removably covering said second opening and having means for supporting a frame part thereon and further having a plurality of small openings therein located so as to direct heat to a confined area of said frame part, and damper means adjacent the openings in said support for controlling the amount of heat passing therethrough, and said anvil comprising an upright having a tapered or conically shaped portion for engagement by a frame bridge member in shaping same, a grooved portion for engagement by a temple in shaping same, and a tongue portion for engagement by a nose pad in shaping same.

Still another object is to provide in a manner as hereinafter set forth a device of the above character which is comparatively simple in construction, efficient in operation, durable, and relatively economical to manufacture.

Other objects and advantages of this invention will become apparent from the following description taken in connection with the accompanying drawings, in which:

Fig. 3 (sheet 1) is a fragmentary top plan view of the heating unit illustrating the method of heating a bridge member;

In shaping portions of eyeglass frames made of heat softenable material by prior art methods, it is the general practice to subject the portion to be shaped to heat and strain in order to shape the part as desired. In the shaping of bridge portions, for example, of ophthalmic frames of this kind, it is generally the custom to subject the bridge to heat and then by the use of hand tools to stretch or otherwise conform the bridge to the desired size and shape. However, in heating the bridge portions it has been difficult to apply the heat only to the bridge and not to the adjacent areas of the rims. Thus, in stretching and shaping the bridge it often happens that the rims become misshapen or deformed due to the fact that they have been heated also. This disadvantage also applied to other frame portions such, for example, as temples when it is desired to shape only a small area thereof but must necessarily by prior art methods apply heat to a large area.

In addition to the above disadvantage there is an additional disadvantage in that many devices are constructed in such a manner that the anvil used to shape the frame portions also carries the heat by which the frame portions are softened. This results many times in burning of the fingers or hands of the operator of the device.

The present invention overcomes the above disadvantages by providing a device embodying heating means separate from the anvil, the heating means being adapted to control the amount of heat directed to a portion to be shaped as well as to confine the heat to specific areas thereof.

Figure 1:
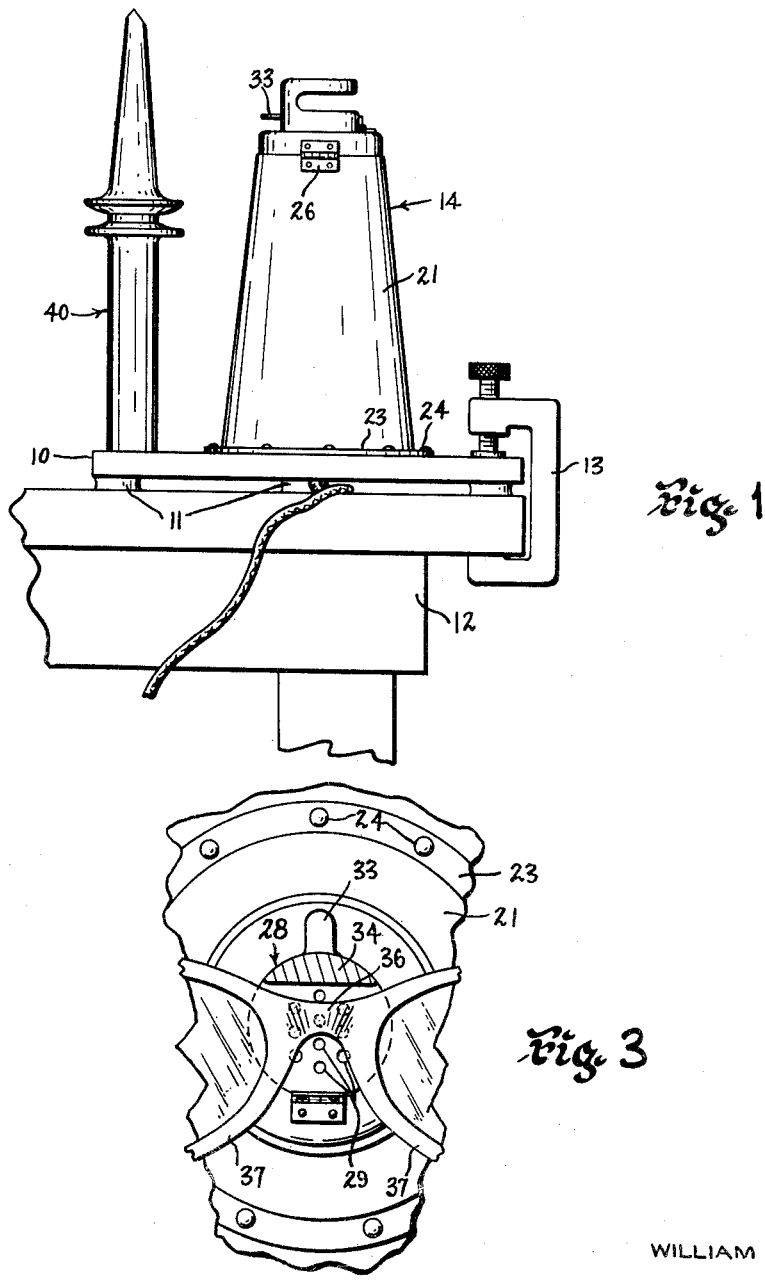
Fig. 1 is a front elevational view of a preferred embodiment of the invention.
Figure 2:
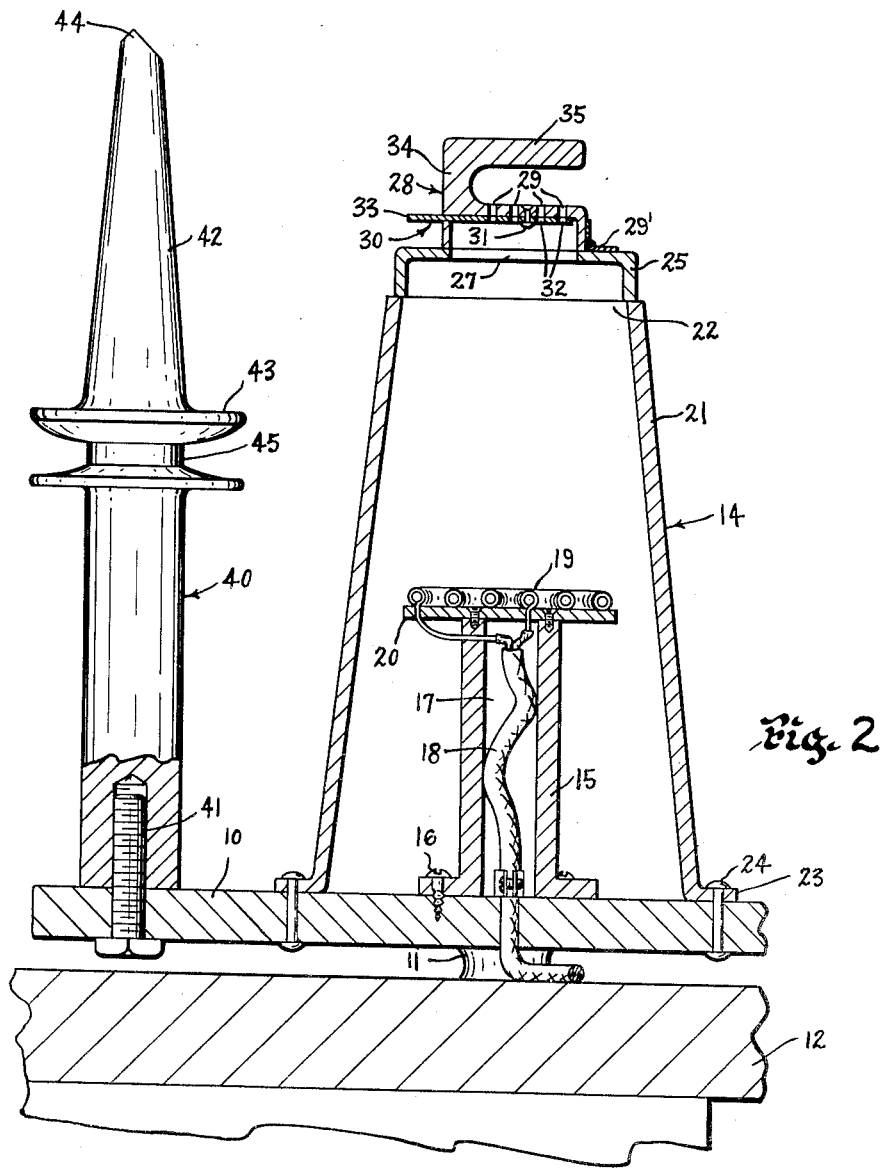
Fig. 2 is a slightly enlarged sectional view of the embodiment shown in Fig. 1.

Referring to the drawings, and particularly to Figs. 1 and 2 illustrating a preferred embodiment of the invention, there is provided a portable device which can be moved about as desired and used wherever there is available a suitable source of electric current. The device comprises mainly a base 10 which can be suitably seated as by legs 11 on any suitable table, bench or the like 12 and, if desired, clamped immovably thereto as by clamping means 13.

The heating device 14 comprises a support 15 having one end secured to the base 10 as by screws 16 and having a vertical bore 17 formed therein carrying wiring 18, one end of which is connected to a heating element 19 which is supported upon a platform 20 secured to the upper end of the support 15. The other end of the wiring 18 extends through an opening in the base 10 and is connected to a suitable source of electrical current (not shown). Mounted over the support 15 and heating element 19 is an upirght housing 21, preferably substantially conically shaped and having an opening 22 in its upper end. The lower end of the housing 21 is preferably formed with a flange 23 or other means for securement to the base 10 as by rivets 24 or the like.

Mounted over and enclosing the opening 22 in the housing 21 is a cover 25 which is hinged at 26 (Fig. 1) to the upper end of the housing 21 and thus is adapted to be moved into and out of closed relation with the opening 22. The cover 25 is provided in its upper surface with an opening 27 communicating with the interior of the housing 21, the latter opening 27 being of smaller size than the opening 22 in the housing 21.

A cap 28 is hinged at 29' to the cover 25 and is adapted to be moved into and out of closed relation with the opening 27. A plurality of smaller openings 29 are provided in the cap 28 for permitting heat within the housing 21 to escape therethrough after passing through openings 22 and 27. A damper 30 of suitable type can be pivotally secured as at 31 to the cap 28 to control the amount of heat permitted to pass upwardly through the openings 29, the damper 30 being preferably of the type having a plurality of openings 32 therein alignable with the openings 29 whereby upon manual manipulation of the handle portion 33 extending outwardly of the cap 28 through a slot provided therefor the openings 32 can be adjusted with respect to the openings 29 and thus control the heat passing therethrough.

The cap 28 is further provided with a short upstanding portion 34 preferably formed integral therewith, the portion 34 having an integral shelf 35 extending therefrom into overlying spaced relation to the portion of the cap having the openings 29 therein. Thus, it will be understood that heat emanating from the element 19 will pass upwardly through the openings 22, 27, 32 and 29 into the space beneath the shelf 35 and will be reflected downwardly by the shelf 35.

In applying heat to a portion of an ophthalmic frame such, for example, as a bridge 36 (Fig. 3), the frame is held with the bridge 36 positioned beneath the shelf 35 and above the openings 29. It will be understood here that by limiting the number of openings, the size, and the positions thereof in the cap 28 the heat passing upwardly from the interior of the housing 21 can be confined to the bridge 36 only without substantially affecting the rims 37 of the frame.

Thus, heat of a controlled amount can pass through the openings 29 against the underside of the bridge 36, and onto the underside of the shelf 35 from which it will be deflected onto the upper surface of the bridge 36.

The cap 28 can be removed to expose the opening 27 when it is desired to permit a greater amount or area of heat to be radiated onto a frame portion such, for example, as a nose pad 38 or temple held over the opening 27, while the cover 25 may also be removed for the general heating of a bridge and nose pad, a frame portion, temple endpiece or other part of the frame over a still greater expanse.

The anvil 40 used to shape the various frame portions after they are heated is fixedly secured to the base 10 as by a bolt 41 (Fig. 2) and is formed in the shape of an upright rod having a conical or tapered upper portion 42 and an enlarged central portion 43.

Figure 7:
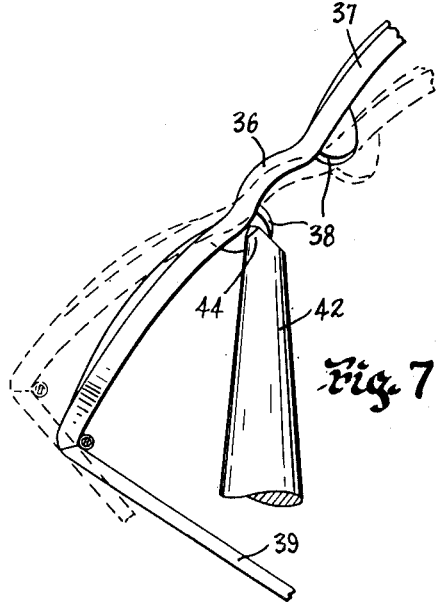
Fig. 7 is a diagrammatic view illustrating the method of shaping the concave surface of a nose pad.

The tapered upper portion 42 is formed with a tongue 44 at its upper end, see Fig. 7, shaped to engage the rear or concaved surface of the nose pad 38 to enable the pad to be adjusted inwardly to meet the fitting requirements of a particular individual. In shaping the nose pad 38, the frame is held with the rear surface of the pad, which has been previously heated and softened by the heating device as hereinbefore described, positioned against the tongue 44. Then by manually moving the frame as shown in dotted outline in Fig. 7 the pad can be shaped or angled inwardly as desired. This method can be used to narrow the spacing between the nose pads to enable the mounting to be fitted more accurately on the face of a wearer requiring such fit.

Figure 8:
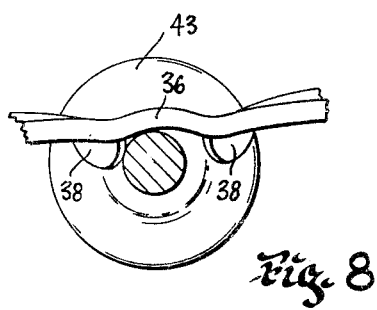
Fig. 8 (sheet 2) is a diagrammatic view illustrating the method of shaping the convex surface of a nose pad.

To alter or widen the distance between the pads, the nose engaging surface of a heated nose pad 38 is positioned against the tapered upper portion 42 of the anvil 40, as shown in Fig. 8, and pressure is applied while the frame is manipulated to perform the desired adjustment or alteration.

Figure 4:
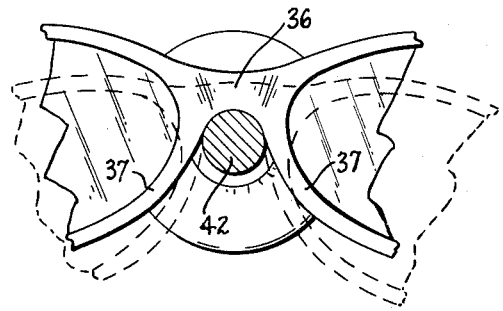
Figs. 4 and 5 (sheet 3) are diagrammatic views showing the method of shaping a bridge member on the anvil.
Figure 5:
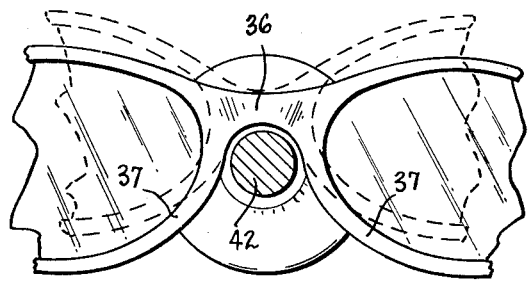

In shaping or altering the size of a bridge 36 as desired, such as stretching it to enable the frame to be lengthened without changing the shape or relative positions of the adjacent lens carrying rims 37, the bridge 36 is heated as described and the mounting then placed on the tapered portion 42 of the anvil with the portion 42 engaging the lower contour edge of the bridge 36 and nasal sides of the opposed rims 37. By manually pulling the lower sides of the rims inwardly, as shown in dotted outline in Fig. 4, the softened material in the bridge 36 will be stretched. It is then manually returned to a position substantially that indicated in full lines. This will enable the frame to be slid farther downwardly on the anvil portion 42 (see Fig. 5) where the process can be repeated if necessary. The rims 37 can be made to project from the bridge 36 at any angle by this method and thus change the entire design and appearance of the frame if desired. This may necessitate slight re-angling of the temple endpieces and a shifting and re-aligning of the horizontal axes of the lenses.

Figure 6:
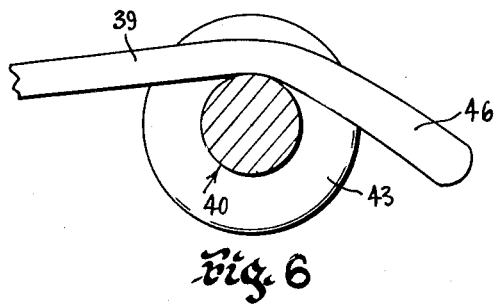
Fig. 6 is a diagrammatic view illustrating the method of shaping a temple.

The enlarged central portion 43 of the anvil 40 has a groove 45 formed circumferentially thereof, the opposed sides of the groove 45 having curved surfaces of predetermined radii, the upper one of which is convexly curved. In shaping a temple 39, the portion to be bent is heated and softened by the heating device 14 as described and is then positioned within the groove 45 in engagement with the cylindrical base of the groove as shown in Fig. 6. Pressure is then applied on the temple to cause the temple to be bent about said base and assume the shape desired in one plane. A compound bend in a direction transversely of said plane may be introduced by also exerting further pressure on the temple during said first mentioned bending against the convexly curved surface whereby the curved surfaces of the base and convexly curved side surface of the grooved portion will enable a compound bending of the temple to be performed.

It is particularly pointed out that the anvil 40 is supported preferably in spaced relation with the main heating unit. This spacing is for the purpose of preventing the anvil from becoming overheated during the use of the device. It has been found preferable to endeavor to maintain the anvil at room temperature but it is to be understood, however, that separate means might be provided for varying the temperature of the anvil, if desired.

From the foregoing, it will be seen that all of the objects and advantages of the invention have been accomplished by providing novel means for separately heating and shaping portions of ophthalmic frames made of heat softenable material, the unit including means for controlling the amount and area of distribution of the heat the amount and areas of distribution of the heat directed to the portions of the frame to be shaped or altered and further embodying means whereby said alterations may be performed in a simple and efficient manner.

While the novel features of the invention have been described and are pointed out in the annexed claims, it will be understood that various omissions, substitutions, and changes may be made in the means and methods described, by those skilled in the art, without departing from the spirit of the invention.

I claim:

1. A temple shaping device comprising a support on which is mounted an anvil of relatively rigid material having a circumferentially extending recess, the base of which recess is approximately cylindrical in shape to provide a surface about which the temple may be bent in one plane, and said recess having one side thereof convexly curving in an outward direction and providing an annular convexly curved surface about which the temple may be bent in a direction transversely of said plane whereby a compound bend may be introduced on the temple to obtain a desired fit with the wearer's head.

2. A temple shaping device comprising a support on which is mounted an upright of relatively rigid material having a pair of outwardly extending flanges providing a circumferentially extending groove therebetween, the base of which groove is approximately equal to the width of the temples to be shaped and being cylindrical in shape to provide means about which the temple may be bent in one plane, and said groove further having one side convexly curving in an outward direction to provide an annular convexly curved surface on the side of said cylinder surface about which the temple may be bent in a direction transversely of said plane whereby a compound bend may be introduced on the temple to obtain a desired fit with the wearer's head.

WILLIAM B. HEATH.

References Cited in the file of this patent

UNITED STATES PATENTS

| Number | Name | Date |
|---|---|---|
| 863,578 | Barnes | Aug. 20, 1907 |
| 882,012 | Morris | Mar. 17, 1908 |
| 1,264,519 | Hinson | Apr. 30, 1918 |
| 1,550,386 | Neuwirth et al. | Aug. 18, 1925 |
| 1,593,865 | Caron | July 27, 1926 |
| 1,609,110 | Brown | Nov. 30, 1926 |
| 1,859,056 | Seelert | May 17, 1932 |
| 1,941,846 | Lloyd | Jan. 2, 1934 |
| 2,502,088 | Gorski | Mar. 28, 1950 |